(12) United States Patent
Filippov et al.

(10) Patent No.: US 11,102,474 B2
(45) Date of Patent: Aug. 24, 2021

(54) DEVICES AND METHODS FOR INTRA PREDICTION VIDEO CODING BASED ON A PLURALITY OF REFERENCE PIXEL VALUES

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/383,338

(22) Filed: Apr. 12, 2019

(65) Prior Publication Data

US 2019/0238838 A1    Aug. 1, 2019

Related U.S. Application Data

(63) Continuation of application No. PCT/RU2016/000705, filed on Oct. 14, 2016.

(51) Int. Cl.
*H04N 19/105* (2014.01)
*H04N 19/159* (2014.01)
(Continued)

(52) U.S. Cl.
CPC .......... *H04N 19/105* (2014.11); *H04N 19/11* (2014.11); *H04N 19/136* (2014.11);
(Continued)

(58) Field of Classification Search
CPC .... H04N 19/105; H04N 19/593; H04N 19/11; H04N 19/189; H04N 19/159; H04N 19/136; H04N 19/182; H04N 19/176
(Continued)

(56) References Cited

U.S. PATENT DOCUMENTS

2010/0118943 A1    5/2010   Shiodera et al.
2011/0182357 A1    7/2011   Kim et al.
(Continued)

FOREIGN PATENT DOCUMENTS

CN    101361370 A    2/2009
CN    103283237 A    9/2013
(Continued)

OTHER PUBLICATIONS

Alshina et al., "Performance of JEM1.0 tools analysis by Samsung", Joint Video Exploration Team (JVET) of ITU-T SG 16 WP 3 and ISO/IEC JTC 1/SC 29/WG 11, JVET-B0022_r1, 2nd Meeting: San Diego, USA, 28 pages, Feb. 20-26, 2016.
(Continued)

*Primary Examiner* — Susan E. Hodges

(74) *Attorney, Agent, or Firm* — Leydig, Voit & Mayer, Ltd.

(57) ABSTRACT

Pixel values of a current video coding block are intra predicted on the basis of a plurality of reference pixel values. A pixel value of a current pixel is intra predicted on the basis of: a first reference pixel value, wherein the first reference pixel is located in a first neighboring video coding block, a second reference pixel value, wherein the second reference pixel is located in a second neighboring video coding block,
(Continued)

a distance between the current pixel and the first reference pixel, and a distance between the current pixel and the second reference pixel.

22 Claims, 13 Drawing Sheets

(51) Int. Cl.
*H04N 19/176* (2014.01)
*H04N 19/182* (2014.01)
*H04N 19/11* (2014.01)
*H04N 19/593* (2014.01)
*H04N 19/136* (2014.01)
*H04N 19/189* (2014.01)

(52) U.S. Cl.
CPC ......... *H04N 19/159* (2014.11); *H04N 19/176* (2014.11); *H04N 19/182* (2014.11); *H04N 19/189* (2014.11); *H04N 19/593* (2014.11)

(58) Field of Classification Search
USPC ........................................................ 375/240
See application file for complete search history.

(56) References Cited

U.S. PATENT DOCUMENTS

| 2011/0293001 | A1 | 12/2011 | Lim et al. | |
|---|---|---|---|---|
| 2013/0251036 | A1 | 9/2013 | Lee et al. | |
| 2013/0272405 | A1* | 10/2013 | Jeon | H04N 19/105 375/240.15 |
| 2014/0092980 | A1* | 4/2014 | Guo | H04N 19/593 375/240.16 |
| 2015/0350640 | A1* | 12/2015 | Jeong | H04N 19/11 375/240.12 |
| 2018/0316914 | A1* | 11/2018 | Kondo | H04N 19/147 |

FOREIGN PATENT DOCUMENTS

| KR | 20150140848 A | 12/2015 |
|---|---|---|
| KR | 20190055253 A | 5/2019 |
| WO | 2016066093 A1 | 5/2016 |

OTHER PUBLICATIONS

Yu et al., "Distance-based Weighted Prediction for H.264 Intra Coding" ICALIP 2008, IEEE, Piscatway, NJ, USA, 1477-1480 (2008).
Wang et al., "A Novel Weighted Cross Prediction for H.264 Intra Coding", ICME 2009, IEEE, Piscatway, NJ, USA,165-168 (2009).
Po et al., "Distance-Based Weighted Prediction for Adaptive Intra Mode Bit Skip in H.264/AVC", Proceedings of 2010 IEEE 17th International Conference on Image Processing (ICIP 2010), Sep. 26-29, 2010, Hong Kong, pp. 2869-2872 (2010).
Li et al., "Gradient Intra Prediction for Coding of Computer Animated Videos", IEEE Workshop on Multimedia Signal Processing, Victoria, Canada, 50-53 (2006).
Lainema et al., "Intra Coding of the HEVC Standard", IEEE Transactions on Circuits and Systems for Video Technology, 22(12): 1792-1801 (2012).
Filippov et al., "Adaptive Segmentation-based Filtering of Reference Samples for Intra Prediction", 2014 IEEE Visual Communications and Image Processing Conference, IEEE, 526-529 (2014).
Sullivan et al., "Overview of the High Efficiency Video Coding (HEVC) Standard", IEEE Transactions on Circuits and Systems for Video Technology, 22(12): 1649-1668 (2012).
Lin et al., "CE6.a: Report of Bidirectional UDI mode for Intra prediction," Joint Collaborative Team on Video Coding (JCT-VC) of ITU-T SG16 WP3 and ISO/IEC JTC1/SC29/WG11, 6th Meeting: Torino, IT, JCTVC-F509, pp. 1-6 (Jul. 2011).

* cited by examiner

300

301 Intra predicting a pixel value of a current pixel of a current video coding block on the basis of: a first reference pixel value of a first reference pixel of the plurality of reference pixels, wherein the first reference pixel is located in a first neighboring video coding block, a second reference pixel value of a second reference pixel of the plurality of reference pixels, wherein the second reference pixel is located in a second neighboring video coding block, a distance between the current pixel and the first reference pixel, and a distance between the current pixel and the second reference pixel.

Fig. 3

DEVICES AND METHODS FOR INTRA PREDICTION VIDEO CODING BASED ON A PLURALITY OF REFERENCE PIXEL VALUES

CROSS-REFERENCE TO RELATED APPLICATIONS

This application is a continuation of International Application No. PCT/RU2016/000705, filed on Oct. 14, 2016, the disclosure of which is hereby incorporated by reference in its entirety.

TECHNICAL FIELD

Embodiments of the present invention relate to the field of video coding. More specifically, embodiments of the invention relate to an apparatus and a method for intra prediction of a video coding block as well as an encoding apparatus and a decoding apparatus comprising such an intra-prediction apparatus.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason support of video coding standards is a mandatory requirement for almost any video compression application.

The state-of-the-art video coding standards are based on partitioning of a source picture into video coding blocks (or short blocks). Processing of these blocks depend on their size, spatial position and a coding mode specified by an encoder. Coding modes can be classified into two groups according to the type of prediction: intra- and inter-prediction modes. Intra-prediction modes use pixels of the same picture (also referred to as frame or image) to generate reference samples to calculate the prediction values for the pixels of the block being reconstructed. Intra-prediction is also referred to as spatial prediction. Inter-prediction modes are designed for temporal prediction and uses reference samples of previous or next pictures to predict pixels of the block of the current picture. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly to the ITU-T H.264/AVC video coding standard, the HEVC/H.265 video coding standard provides for a division of the source picture into blocks, e.g., coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as DBF, SAO and ALF try to suppress. The use of sophisticated prediction coding (such as motion compensation and intra-prediction) and partitioning techniques (e.g., QT for CUs and PUs as well as RQT for TUs) allowed the standardization committee to significantly reduce the redundancy in PUs.

The prediction tools which led to the prosperous application of these video coding standards can be roughly distinguished into inter and intra prediction tools. While intra prediction solely relies on information which is contained in the current picture, inter prediction employs the redundancy between different pictures to further increase the coding efficiency. Therefore, in general intra prediction requires higher bitrates than inter prediction to achieve the same visual quality for typical video signals.

Nevertheless, intra coding is an essential part of all video coding systems, because it is required to start a video transmission, for random access into ongoing transmissions and for error concealment. In the HEVC standard, however, only one adjacent row/column of pixels is used as a prediction basis for the currently processed video coding block (which in case of HEVC is referred to as coding unit or CU). Furthermore, in case of intra prediction based on an angular prediction, only one direction can be applied per CU. Due to these limitations, high bit rates are required for the residuals of intra coded CUs.

Thus, there is a need for devices and methods for video coding, which allow increasing the coding efficiency for intra prediction.

SUMMARY

It is an object of the invention for devices and methods for video coding, which allow increasing the coding efficiency for intra prediction.

The foregoing and other objects are achieved by the subject matter of the independent claims. Further implementation forms are apparent from the dependent claims, the description and the figures.

The following disclosure employs a plurality of terms which, in embodiments, have the following meaning: Slice—a spatially distinct region of a picture that is independently encoded/decoded. Slice header—Data structure configured to signal information associated with a particular slice. Video coding block (or short block)—an M×N (M-column by N-row) array of pixels or samples (each pixel/sample being associated with at least one pixel/sample value), or an M×N array of transform coefficients. Coding Tree Unit (CTU) grid—a grid structure employed to partition blocks of pixels into macro-blocks for video encoding. Coding Unit (CU)—a coding block of luma samples, two corresponding coding blocks of chroma samples of an image that has three sample arrays, or a coding block of samples of a monochrome picture or a picture that is coded using three separate color planes and syntax used to code the samples. Picture Parameter Set (PPS)—a syntax structure containing syntax elements that apply to zero or more entire coded pictures as determined by a syntax element found in each slice segment header. Sequence Parameter Set (SPS)—a syntax structure containing syntax elements that apply to zero or more entire coded video sequences as determined by the content of a syntax element found in the PPS referred to by a syntax element found in each slice segment header. Video Parameter Set (VPS)—a syntax structure containing syntax elements that apply to zero or more entire coded video sequences. Prediction Unit (PU)—a prediction block of luma samples, two corresponding prediction blocks of chroma samples of a picture that has three sample arrays, or a prediction block of samples of a monochrome picture or a picture that is coded using three separate color planes and syntax used to predict the prediction block samples. Transform Unit (TU)—a transform block of luma samples, two corresponding transform blocks of chroma samples of a picture that has three sample arrays, or a transform block of samples of a monochrome picture or a picture that is coded using three separate color planes and syntax used to predict the transform block samples. Supplemental enhancement information (SEI)—extra information that may be inserted into a video bit-stream to enhance the use of the video. Luma—information indicating the brightness of an image sample. Chroma—information indicating the color of an image sample, which may be described in terms of red difference chroma component (Cr) and blue difference chroma component (Cb).

According to a first aspect the invention relates to an apparatus for intra prediction of pixel values of pixels of a current video coding block of a frame of a video signal on the basis of a plurality of reference pixel values of a plurality of reference pixels. The apparatus comprises an intra prediction unit configured to intra predict a pixel value of a current pixel of the current video coding block on the basis of: a first reference pixel value of a first reference pixel of the plurality of reference pixels, wherein the first reference pixel is located in a first neighboring video coding block, a second reference pixel value of a second reference pixel of the plurality of reference pixels, wherein the second reference pixel is located in a second neighboring video coding block, a distance between the current pixel and the first reference pixel, and a distance between the current pixel and the second reference pixel.

Thus, an improved apparatus for video coding is provided, which allows increasing the coding efficiency for intra prediction.

In a first possible implementation form of the apparatus according to the first aspect, the intra prediction unit is configured to intra predict the pixel value of the current pixel of the current video coding block on the basis of a product of a first weight with the first reference pixel value, wherein the first weight is based on the distance between the current pixel and the first reference pixel and the distance between the current pixel and the second reference pixel, and a product of a second weight with the second reference pixel value, wherein the second weight is based on the distance between the current pixel and the first reference pixel and the distance between the current pixel and the second reference pixel. The apparatus will thus be particularly efficient.

In a second possible implementation form of the apparatus according to the first implementation form of the first aspect, the intra prediction unit is configured to determine the first weight $w_{rs0}$ and the second weight $w_{rs1}$ on the basis of the following equations:

$$w_{rs0} = \frac{d_{rs1}}{D} \text{ and } w_{rs1} = \frac{d_{rs0}}{D},$$

wherein $d_{rs1}$ denotes the distance between the current pixel and the second reference pixel, $d_{rs0}$ denotes the distance between the current pixel and the first reference pixel and D denotes the distance between the first reference pixel and the second reference pixel. The apparatus will thus be particularly efficient.

In a third possible implementation form of the apparatus according to the first or second implementation form of the first aspect, the intra prediction unit is configured to intra predict the pixel value of the current pixel of the current video coding block as a sum of the product of the first weight with the first reference pixel value and the product a second weight with the second reference pixel value. The apparatus will thus be particularly efficient.

In an implementation form, the intra prediction unit is configured to intra predict the pixel values of the pixels of the current video coding block on the basis of the plurality of primary reference pixel values and the plurality of secondary reference pixel values on the basis of the following equation:

$$p[x,y] = w_0 \cdot p_{rs0} + w_1 \cdot p_{rs1},$$

wherein p [x, y] denotes the pixel value of the pixel of the current video coding block having the coordinates x, y, $w_0$ denotes a first weight, $p_{rs0}$ denotes a primary reference pixel value, $w_1$ denotes a second weight, and $p_{rs1}$ denotes a secondary reference pixel value. The apparatus will thus be particularly efficient.

In an implementation form, the intra prediction unit is configured to intra predict the pixel values of the pixels of the current video coding block on the basis of the plurality of primary reference pixel values and the plurality of secondary reference pixel values on the basis of the following equation:

$$p[x, y] = \frac{d_{rs1}}{D} \cdot p_{rs0} + \frac{d_{rs0}}{D} \cdot p_{rs1},$$

wherein $d_{rs0}$ denotes the distance from the primary reference pixel associated with the primary reference pixel value $p_{rs0}$ to the pixel of the current video coding block having the coordinates x, y, $d_{rs1}$ denotes the distance from the secondary reference pixel associated with the secondary reference pixel value $p_{rs1}$ to the pixel of the current video coding block having the coordinates x, y, and D denotes the distance from the primary reference pixel associated with the primary reference pixel value $p_{rs0}$ to the secondary reference pixel associated with the secondary reference pixel value $p_{rs1}$, i.e. $D=d_{rs0}+d_{rs1}$. The apparatus will thus be particularly efficient.

In a fourth possible implementation form of the apparatus according to the first aspect as such or any one of the first to third implementation form thereof, the current pixel, the first pixel and the second pixel substantially lie on a straight line, i.e. define a straight line.

In a fifth possible implementation form of the apparatus according to the first aspect as such or any one of the first to fourth implementation form thereof, the plurality of reference pixel values comprises a plurality of primary reference pixel values, including the first reference pixel, and a plurality of secondary reference pixel values, including the second reference pixel, and wherein the apparatus further comprises a reference pixel unit, wherein the reference pixel unit is configured to generate on the basis of the plurality of primary reference pixel values the plurality of secondary reference pixel values, wherein the plurality of primary reference pixel values are associated with a plurality of primary reference pixels located in neighboring video coding blocks of the current video coding block, including the first neighboring video coding block, and wherein the plurality of secondary reference pixel values are associated with a plurality of secondary reference pixels located in further neighboring video coding blocks of the current video coding block, including the second neighboring video coding block, wherein the further neighboring video coding blocks are not the neighboring video coding blocks. The apparatus will thus be particularly efficient.

In a sixth possible implementation form of the apparatus according to the fifth implementation form of the first aspect, the plurality of primary reference pixels are located in a row of pixels directly above the current video coding block and in a column of pixels to the left or to the right of the current video coding block, or wherein the plurality of primary reference pixels are located in a row of pixels directly below the current video coding block and in a column of pixels to the left or to the right of the current video coding block. The apparatus will thus be particularly efficient.

In a seventh possible implementation form of the apparatus according to the fifth or sixth implementation form of the first aspect, the reference pixel unit is further configured to determine for each secondary reference pixel value of a subset of the plurality of secondary reference pixel values a first component of the secondary reference pixel value on the basis of directional intra prediction and a second component of the secondary reference pixel value on the basis of an interpolation prediction between a first secondary reference pixel value and a second secondary reference pixel value and to combine the first component of the secondary reference pixel value and the second component of the secondary reference pixel value to generate the secondary reference pixel value, wherein the first secondary reference pixel value and the second secondary reference pixel value are not part of the subset of the plurality of secondary reference pixel values. The apparatus will thus be particularly efficient.

As used herein interpolation prediction is based on interpolation methods for predicting a set of unknown values in a given positions using a set of a known values. Interpolation consists in selecting a pre-defined function that approximates a set of known values and calculating values of this function at the positions of the unknown target values. Typical functions used for interpolation are linear, spline or cubic, and could be applied to the whole set of known values or have different parameters for different subsets of known values. The latter case is known as piecewise interpolation.

As used herein directional intra prediction is based on propagating boundary values inside a block to be predicted, so that each pixel value of the predicted block is calculated by projecting the position of that pixel onto a set of reference pixels in the specified direction. In case the projected position is a fractional, lies between pixel positions, sub-pixel interpolation prediction between neighboring pixels can be applied.

In an eighth possible implementation form of the apparatus according to the seventh implementation form of the first aspect, the reference pixel unit is configured to use a directional mode of the H.264 standard, the H.265 standard, or a standard evolved from one of these standards for determining the first component of the secondary reference pixel value on the basis of directional intra prediction. The apparatus will thus be particularly efficient.

In a ninth possible implementation form of the apparatus according to the seventh or eighth implementation form of the first aspect, the reference pixel unit is further configured to determine the first secondary reference pixel value on the basis of the primary reference pixel values of primary reference pixels neighboring the first secondary reference pixel and the second secondary reference pixel value on the basis of the primary reference pixel values of primary reference pixels neighboring the second secondary reference pixel. The apparatus will thus be particularly efficient.

In a tenth possible implementation form of the apparatus according to the ninth implementation form of the first aspect, the reference pixel unit (101) is configured to determine the first secondary reference pixel value $p_{rsg}[0]$ and the second secondary reference pixel value $p_{rsg}[2N]$ on the basis of the following equations:

$$p_{rsg}[0]=w_{int} \cdot p_{int}[0]+w_{rs}[-N] \cdot p_{rs}[-N]+w_{rs}[-N-1] \cdot p_{rs}[-N-1]+w_{rs}[-N-2] \cdot p_{rs}[-N-2]$$

$$p_{rsg}[2N]=w_{int} \cdot p_{int}[2N] w_{rs}[N] \cdot p_{rs}[N]+w_{rs}[N+1] \cdot p_{rs}[N+1]+w_{rs}[N+2] \cdot p_{rs}[N+2],$$

wherein N denotes the linear size of the current video coding block. The apparatus will thus be particularly efficient.

In an eleventh possible implementation form of the apparatus according to any one of the seventh to the tenth implementation form of the first aspect, the reference pixel unit is configured to determine the second component $p_{grad}[k]$ of the secondary reference pixel value on the basis of an interpolation prediction between the first secondary reference pixel value $p_{rsg}[0]$ and the second secondary reference pixel value $p_{rsg}[2N]$ on the basis of the following equation:

$$p_{grad}[k]=p_{rsg}[0]+k \cdot s,$$

with $$s=\frac{p_{rsg}[2N]-p_{rsg}[0]}{2N}.$$

The apparatus will thus be particularly efficient.

In a twelfth possible implementation form of the apparatus according to any one of the seventh to eleventh implementation form of the first aspect, the reference pixel unit is configured to combine the first component $p_{int}[k]$ of the secondary reference pixel value and the second component $p_{grad}[k]$ of the secondary reference pixel value to generate the secondary reference pixel value $p_{rs}[k]$ on the basis of the following equation:

$$p_{rs}[k]=w_{grad}[k] \cdot p_{grad}[k]+w_{int}[k] \cdot p_{int}[k]$$

wherein $w_{grad}[k]+w_{int}[k]=1$ and $0 \leq w_{grad}[k], w_{int}[k] \leq 1$.

In a thirteenth possible implementation form of the apparatus according to the twelfth implementation form of the first aspect, the reference pixel unit is configured to adjust the weights $w_{grad}[k]$ and/or $w_{int}[k]$ depending on the direction, on the index k and/or on the size of the current video coding block. The apparatus will thus be particularly efficient.

According to a second aspect the invention relates to an encoding apparatus for encoding a current video coding block of a frame of a video signal, the current video coding block comprising a plurality of pixels, each pixel associated with a pixel value. The encoding apparatus comprises: an intra prediction apparatus according to the first aspect as such or any one of the implementation forms thereof; and an encoding unit configured to encode the current video coding block on the basis of the predicted video coding block.

According to a third aspect the invention relates to a decoding apparatus for decoding an encoded video coding block of a frame of a video signal, the encoded video coding block comprising a plurality of pixels, each pixel associated with a pixel value. The decoding apparatus comprises: an intra prediction apparatus according to the first aspect as such or any one of the implementations forms thereof for providing a predicted video coding block; and a restoration unit configured to restore a video coding block on the basis of an encoded video coding block and the predicted video coding block.

According to a fourth aspect the invention relates to a method for intra prediction of pixel values of pixels of a current video coding block of a frame of a video signal on the basis of a plurality of reference pixel values of a plurality of reference pixels. The method comprises: intra predicting a pixel value of a current pixel of the current video coding block on the basis of: a first reference pixel value of a first reference pixel of the plurality of reference pixels, wherein the first reference pixel is located in a first neighboring video coding block, a second reference pixel value of a second reference pixel of the plurality of reference pixels, wherein the second reference pixel is located in a second neighboring video coding block, a distance between the current pixel and the first reference pixel, and a distance between the current pixel and the second reference pixel.

The method according to the fourth aspect of the invention can be performed by the intra-prediction apparatus according to the first aspect of the invention. Further features of the method according to the fourth aspect of the invention result directly from the functionality of the intra-prediction apparatus according to the first aspect of the invention and its different implementation forms.

According to a fifth aspect the invention relates to a computer program comprising program code for performing the method according to the fourth aspect when executed on a computer.

The invention can be implemented in hardware and/or software.

BRIEF DESCRIPTION OF THE DRAWINGS

Further embodiments of the invention will be described with respect to the following figures, wherein:

FIG. 3 shows a schematic diagram illustrating an intra-prediction method according to an embodiment;

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
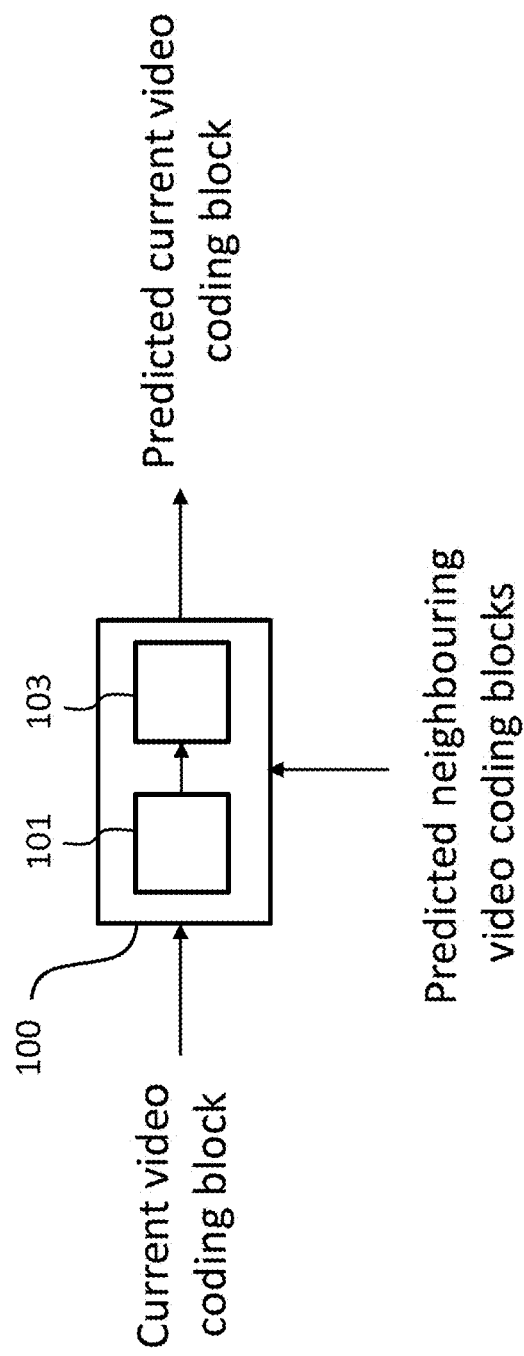
FIG. 1 shows a schematic diagram illustrating an intra-prediction apparatus according to an embodiment.

FIG. 1 shows a schematic diagram illustrating an intra prediction apparatus 100 according to an embodiment.

The intra prediction apparatus 100 is configured to intra predict pixel values of pixels of a current video coding block of a frame of a video signal on the basis of a plurality of reference pixel values of a plurality of reference pixels.

The intra prediction apparatus 100 comprises an intra prediction unit 103 configured to intra predict a pixel value of a current pixel of the current video coding block on the basis of: a first reference pixel value of a first reference pixel of the plurality of reference pixels, wherein the first reference pixel is located in a first neighboring video coding block, a second reference pixel value of a second reference pixel of the plurality of reference pixels, wherein the second reference pixel is located in a second neighboring video coding block, the distance between the current pixel and the first reference pixel, and the distance between the current pixel and the second reference pixel. Generally, the position of the current pixel, the position of the first pixel and position of the second pixel define a straight line.

In an embodiment, the intra prediction unit 103 is configured to intra predict the pixel value of the current pixel of the current video coding block on the basis of: a product of a first weight with the first reference pixel value, wherein the first weight is based on the distance between the current pixel and the first reference pixel and the distance between the current pixel and the second reference pixel, and a product of a second weight with the second reference pixel value, wherein the second weight is based on the distance between the current pixel and the first reference pixel and the distance between the current pixel and the second reference pixel.

In an embodiment, the intra prediction unit 103 is configured to determine the first weight $w_0$ and the second weight $w_1$ on the basis of the following equations:

$$w_0 = \frac{d_{rs1}}{D} \text{ and } w_1 = \frac{d_{rs0}}{D},$$

wherein $d_{rs1}$ denotes the distance between the current pixel and the second reference pixel, $d_{rs0}$ denotes the distance between the current pixel and the first reference pixel and D denotes the distance between the first reference pixel and the second reference pixel.

In an embodiment, the intra prediction unit 103 is configured to intra predict the pixel value of the current pixel of the current video coding block as a sum of the product of the first weight with the first reference pixel value and the product a second weight with the second reference pixel value, for instance, on the basis of the following equation:

$$p[x,y] = w_0 \cdot p_{rs0} + w_1 \cdot p_{rs1},$$

wherein p [x, y] denotes the pixel value of the current pixel having the coordinates x, y, $p_{rs0}$ denotes the first reference pixel value, and $p_{rs1}$ denotes the second reference pixel value.

Thus, in an embodiment the intra prediction unit 103 is configured to intra predict the pixel value of the current pixel of the current video coding on the basis of the following equation:

$$p[x, y] = \frac{d_{rs1}}{D} \cdot p_{rs0} + \frac{d_{rs0}}{D} \cdot p_{rs1}.$$

In a further embodiment, the intra prediction unit 103 is configured to intra predict the pixel value of the current pixel of the current video coding on the basis of the following equation:

$$p[x, y] = w_{rs0} \cdot \frac{d_{rs1}}{D} \cdot p_{rs0} + w_{rs1} \cdot \frac{d_{rs0}}{D} \cdot p_{rs1},$$

wherein $w_{rs0}$ denotes a weighting coefficient defining the contribution of the first reference pixel value to the predicted pixel value and $w_{rs1}$ denotes a weight coefficients defining the contribution of the second reference pixel value to the predicted pixel value and wherein $w_{rs0}+w_{rs1}=1$. The values of the weighting coefficients $w_{rs0}$, $w_{rs1}$ can be defined, for instance, by the size of the currently processed video coding block, a skew-directional intra-prediction mode index, or explicitly signaled information on the syntax elements that directly or indirectly define the values of these weighting coefficients.

In an embodiment, the plurality of reference pixel values comprises a plurality of primary reference pixel values, including the first reference pixel, and a plurality of secondary reference pixel values, including the second reference pixel. In an embodiment, the apparatus 100 further comprises a reference pixel unit 101, wherein the reference pixel unit 101 is configured to generate on the basis of the plurality of primary reference pixel values the plurality of secondary reference pixel values, wherein the plurality of primary reference pixel values are associated with a plurality of primary reference pixels located in neighboring video coding blocks of the current video coding block, including the first neighboring video coding block, and wherein the plurality of secondary reference pixel values are associated with a plurality of secondary reference pixels located in further neighboring video coding blocks of the current video coding block, including the second neighboring video coding block, wherein the further neighboring video coding blocks are not the neighboring video coding blocks.

In an embodiment, the plurality of primary reference pixels are located in a row of pixels directly above the current video coding block and in a column of pixels to the left or to the right of the current video coding block. In a further embodiment, the plurality of primary reference pixels are located in a row of pixels directly below the current video coding block and in a column of pixels to the left or to the right of the current video coding block.

In an embodiment, the current video coding block is a quadratic video coding block or a rectangular video coding block.

Further embodiments of the intra prediction apparatus 100 will be described further below.

Figure 2:
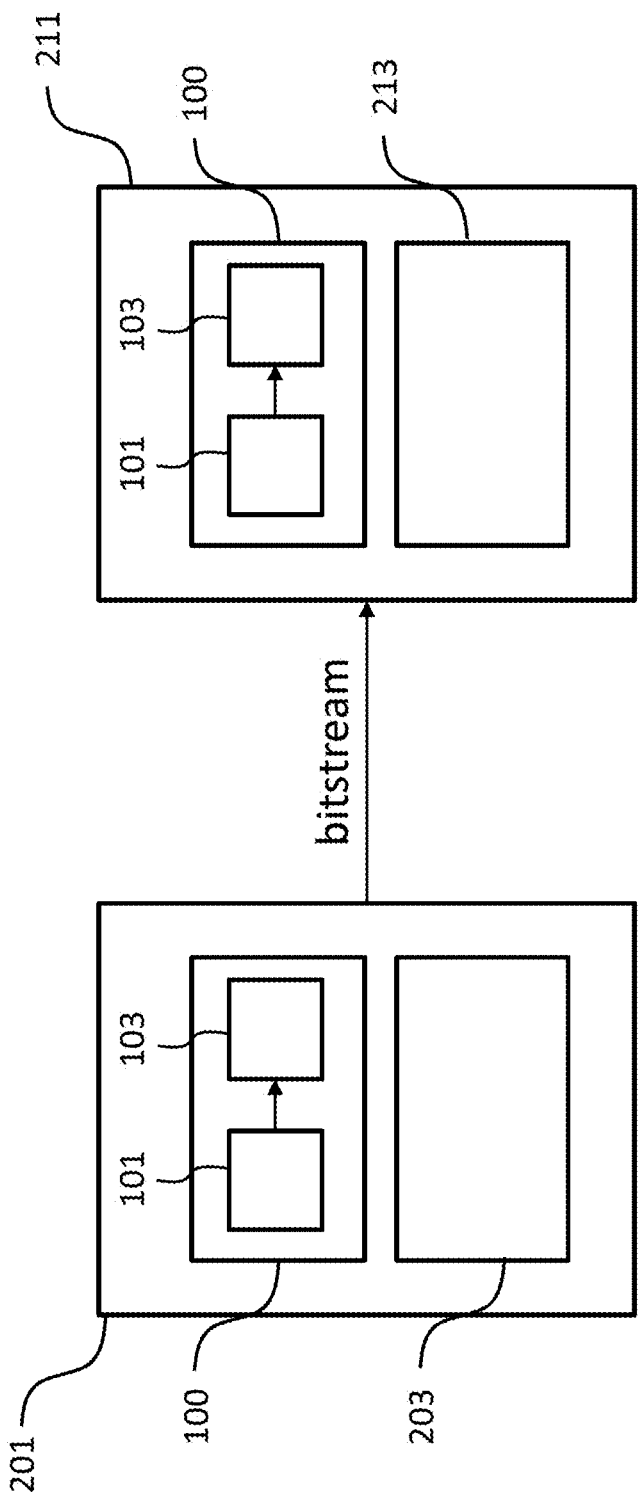
FIG. 2 shows a schematic diagram illustrating an encoding apparatus according to an embodiment and a decoding apparatus according to an embodiment.

FIG. 2 shows a schematic diagram illustrating an encoding apparatus 201 according to an embodiment and a decoding apparatus 211 according to an embodiment.

The encoding apparatus 201 is configured to encode a current video coding block of a frame of a video signal, wherein the current video coding block comprises a plurality of pixels and each pixel is associated with a pixel value. The encoding apparatus 201 comprises the intra prediction apparatus 100 shown in FIG. 1 for providing a predicted video coding block and an encoding unit 203 configured to encode the current video coding block on the basis of the predicted video coding block and providing the encoded current video coding block, for instance, in the form of a bitstream. Further embodiments of the encoding apparatus 201 will be described further below. In an embodiment, the encoding apparatus 201 could be implemented as a hybrid encoder, as defined, for instance, in the HEVC standard, and could comprise further components, such as an entropy encoder.

The decoding apparatus 211 is configured to decode the encoded video coding block of a frame of a video signal, which is contained in the bitstream provided by the encoding apparatus 201, wherein the encoded video coding block comprises a plurality of pixels and each pixel is associated with a pixel value. The decoding apparatus 211 comprises the intra prediction apparatus 100 shown in FIG. 1 for providing a predicted video coding block and a restoration unit 213 configured to restore a video coding block on the basis of the encoded video coding block and the predicted video coding block. Further embodiments of the decoding apparatus 211 will be described further below. In an embodiment, the decoding apparatus 211 could be implemented as a hybrid decoder, as defined, for instance, in the HEVC standard, and could comprise further components, such as a decoding unit for providing a residual video coding block on the basis of the encoded video coding block.

FIG. 3 shows a schematic diagram illustrating a method 300 for intra prediction of pixel values of pixels of a current video coding block of a frame of a video signal on the basis of a plurality of reference pixel values of a plurality of reference pixels.

The intra prediction method 300 comprises a step 301 of intra predicting a pixel value of a current pixel of the current video coding block on the basis of: a first reference pixel value of a first reference pixel of the plurality of reference pixels, wherein the first reference pixel is located in a first neighboring video coding block, a second reference pixel value of a second reference pixel of the plurality of reference pixels, wherein the second reference pixel is located in a second neighboring video coding block, a distance between the current pixel and the first reference pixel, and a distance between the current pixel and the second reference pixel.

Further embodiments of the intra prediction method 300 will be described further below.

Figure 4:
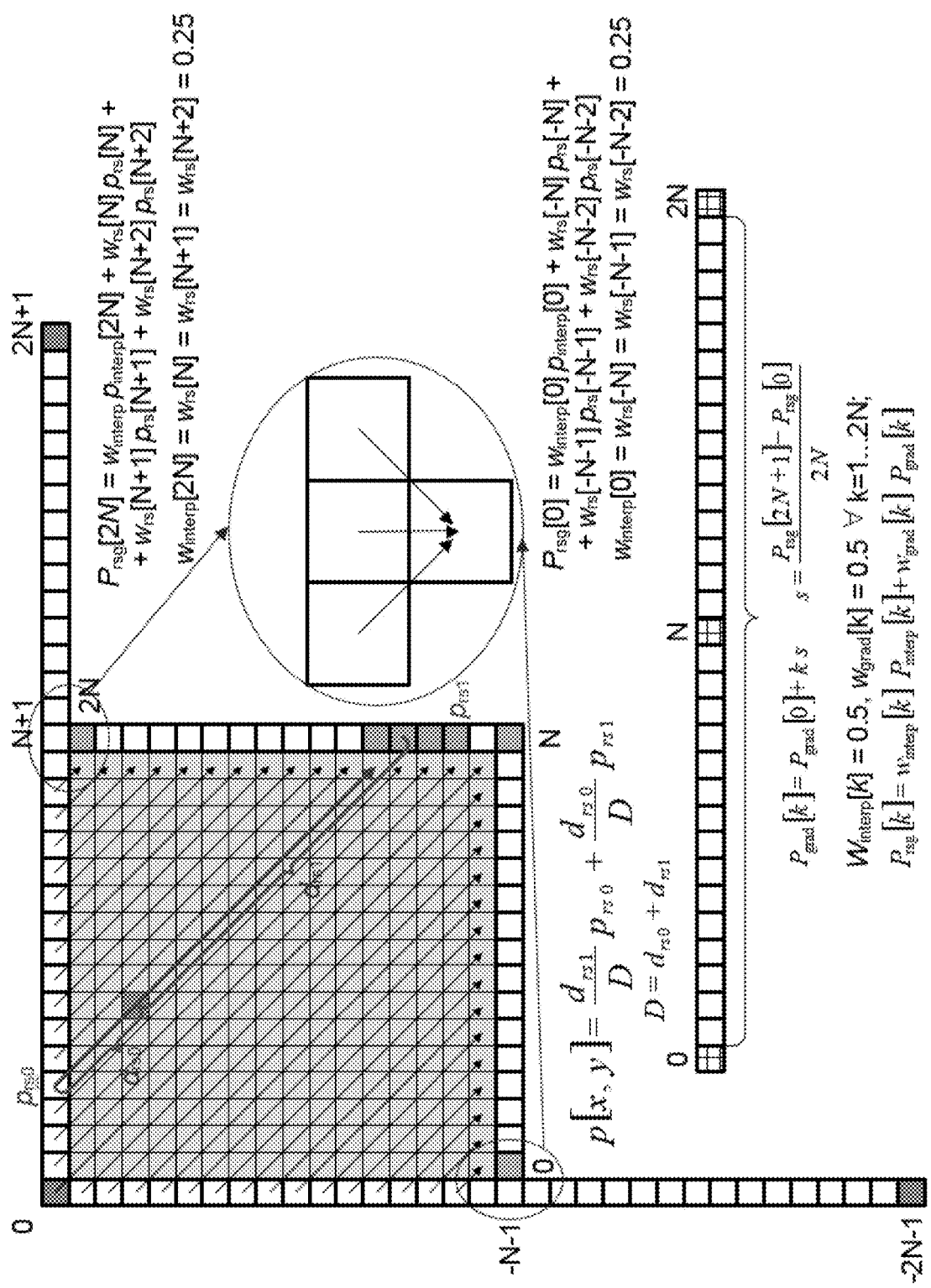
FIG. 4 shows a schematic diagram of a video coding block illustrating several aspects of an intra-prediction apparatus according to an embodiment.

FIG. 4 shows a schematic diagram of an exemplary current video coding block illustrating several aspects of the intra prediction apparatus 100 and the intra prediction method 300 according to an embodiment, in particular the relationship between the pixel value of the current pixel, the first reference pixel value and the second reference pixel value. The corresponding processing steps implemented in the intra prediction apparatus 100 and the intra prediction method 300 according to an embodiment are shown in FIGS. 5a and 5b.

In FIG. 4 the grey square of pixels represents the exemplary currently processed video coding block. For the exemplary current video coding block shown in FIG. 4 the primary reference pixels are the pixels in the row of pixels above the current video coding block and the pixels in the column of pixels to the left of the current video coding block. Thus, in the embodiment shown in FIG. 4, the primary reference pixels belong to neighboring video coding blocks, which already have been intra predicted, i.e. processed by the intra prediction apparatus 100. In FIG. 4 the primary reference pixels in the row above the current video coding block are indexed from 0 to 2N and the primary reference pixels in the column of pixels to the left of the current video coding block are indexed from 0 to −2N.

Figure 5A:
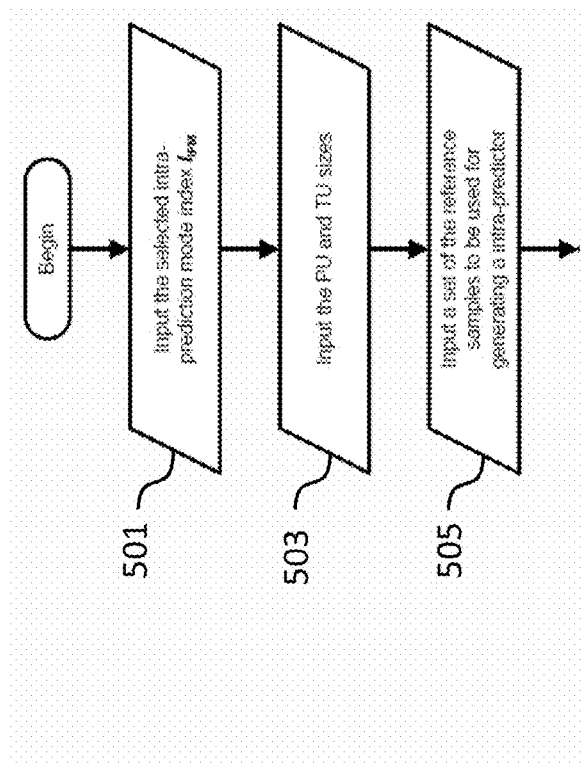
FIGS. 5a and 5b show a diagram illustrating intra-prediction processing steps implemented in an intra-prediction apparatus according to an embodiment.
Figure 5B:
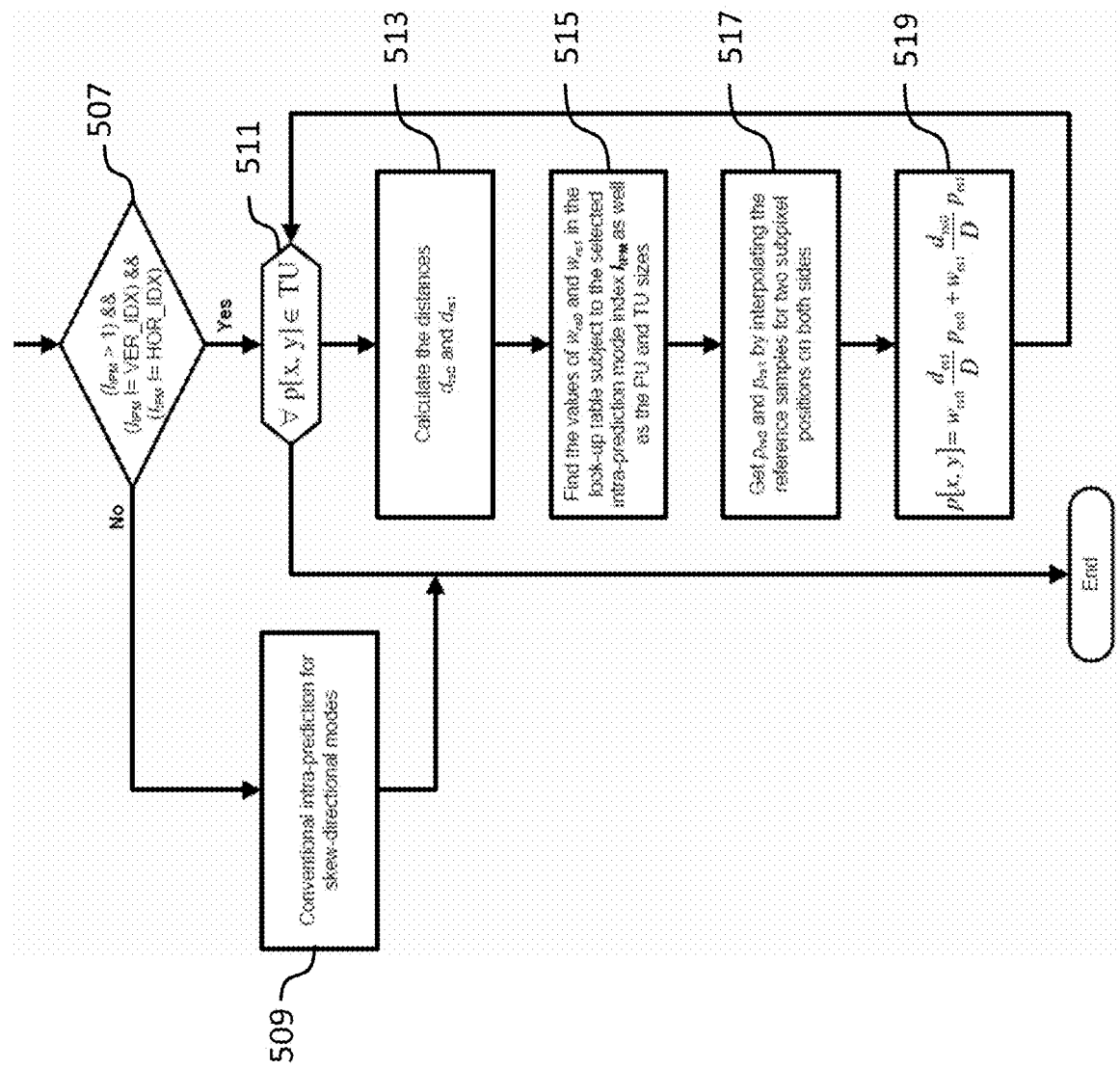

FIGS. 5a and 5b show a diagram illustrating intra-prediction processing steps implemented in the intra-prediction apparatus 100 according to an embodiment. After processing steps of inputting the selected intra-prediction mode index (processing step 501), the size of the currently processed video coding block (processing step 503) and the plurality of reference samples (processing step 505), the apparatus 100 checks in processing step 507 on the basis of this input whether to intra predict the currently processed video coding block on the basis of conventional intra prediction modes (processing step 509) or on the basis of the intra prediction provided by the intra prediction unit 103 of the apparatus 100, which has been described above. In the latter case, the apparatus 100 enters a loop 511 for processing all the pixels of the currently processed video coding block. The loop comprises the following processing steps: calculating the distance $d_{rs0}$ between the current pixel and the first reference pixel and the distance $d_{rs1}$ between the current pixel and the second reference pixel (processing step 513), selecting values for the weighting coefficients $w_{rs0}$, $w_{rs1}$, for instance, on the basis of a look-up table (processing step 515), if necessary, interpolating reference samples for obtaining the first reference pixel value $p_{rs0}$ and the second reference pixel value $p_{rs1}$ (processing step 517), and intra predicting the pixel value of the current pixel on the basis of the following equation (processing step 519):

$$p[x, y] = w_{rs0} \cdot \frac{d_{rs1}}{D} \cdot p_{rs0} + w_{rs1} \cdot \frac{d_{rs0}}{D} \cdot p_{rs1}.$$

The processing scheme illustrated in FIGS. 5a and 5ab is applicable at both the encoder and the decoder sides. On the encoder side, the intra-prediction mode selection for the proposed distance-weighted mechanism can be performed using conventional techniques, such as using a RD-cost criterion.

FIG. 4 illustrates as an example the case, where the intra prediction apparatus 100 intra predicts the pixel value of the pixel of the currently processed video coding block, i.e. the currently processed pixel, which is identified in FIG. 4 by a darker shade of grey. For the intra prediction mode having an exemplary direction of 45° assumed in FIG. 4 the reference pixel unit 101 is configured to determine the first reference pixel $p_{rs0}$ associated with the currently processed pixel. Moreover, the second reference pixel $p_{rs1}$ on the "opposite side" of the currently processed pixel is determined (this is also illustrated in the processing steps 601, 603 and 605 of FIG. 6). The position of the second reference pixel $p_{rs1}$ depends on the intra-prediction mode, the size of the block to be predicted and the position of the currently processed pixel being predicted. If this position does not coincide with a primary (i.e. already predicted) reference pixel (see also processing step 603 of FIG. 6), the corresponding second reference pixel value will be determined as follows.

Figure 6:
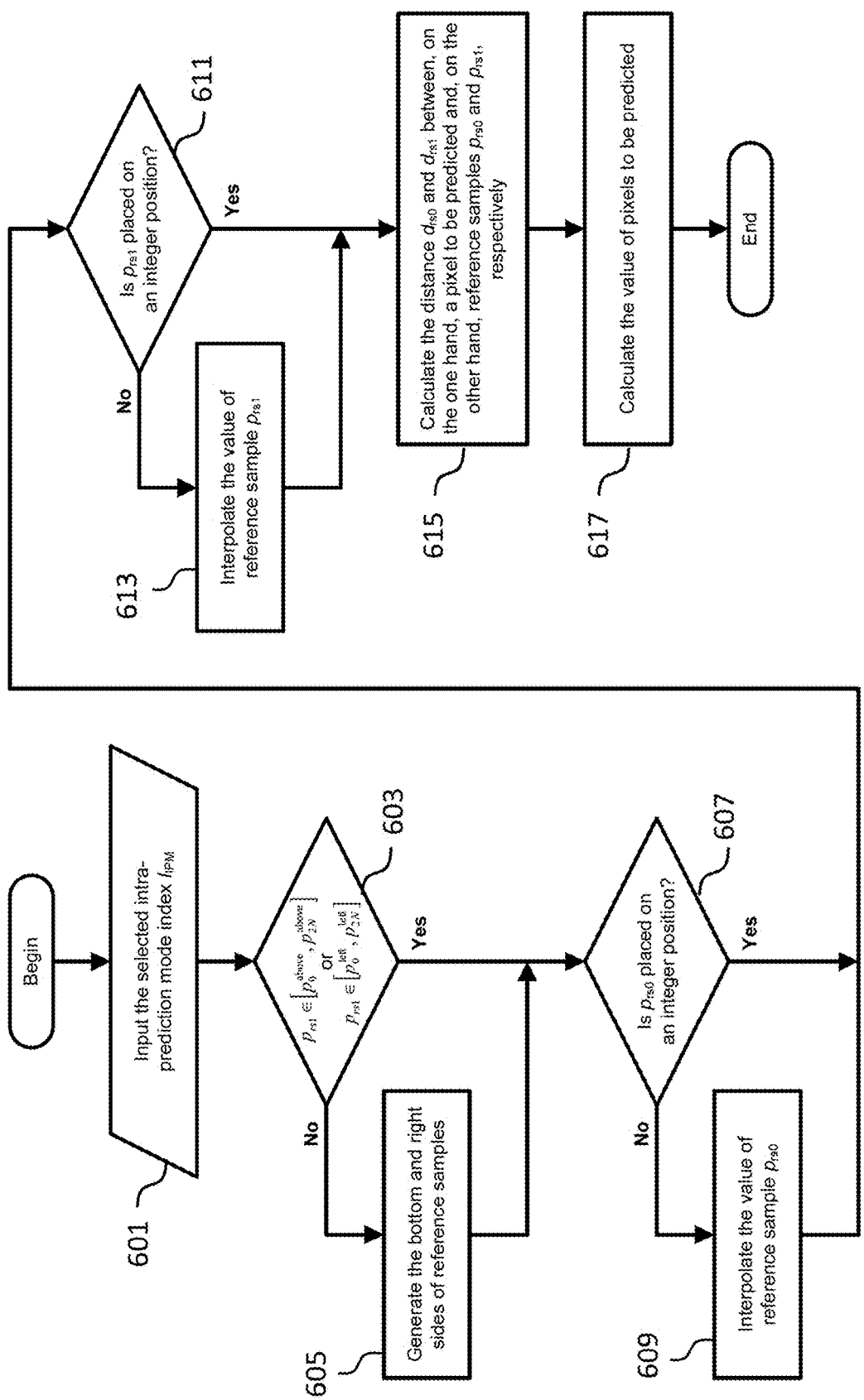
FIG. 6 shows a diagram illustrating intra-prediction processing steps implemented in an intra-prediction apparatus according to an embodiment.

The first reference pixel $p_{rs0}$ and/or the second reference pixel $p_{rs1}$ might not be located at integer pixel positions and, therefore, may require a sub-pixel interpolation process, e.g. as defined by the HEVC standard (see also processing steps 607, 609, 611 and 613 of FIG. 6).

In a next stage, at steps 615 and 617, the intra prediction unit 103 of the apparatus 100 is configured to intra predict the pixel value of the currently processed pixel on the basis of the first reference pixel value $p_{rs0}$ and the second reference pixel value $p_{rs1}$, as described above.

The embodiment shown in FIG. 4 uses the generation of secondary reference samples, i.e. pixel values, for the unknown sides of the currently processed video coding block. In the HEVC standard, for instance, the unknown sides are the right side and the bottom side of the currently processed video coding block.

Figure 7:
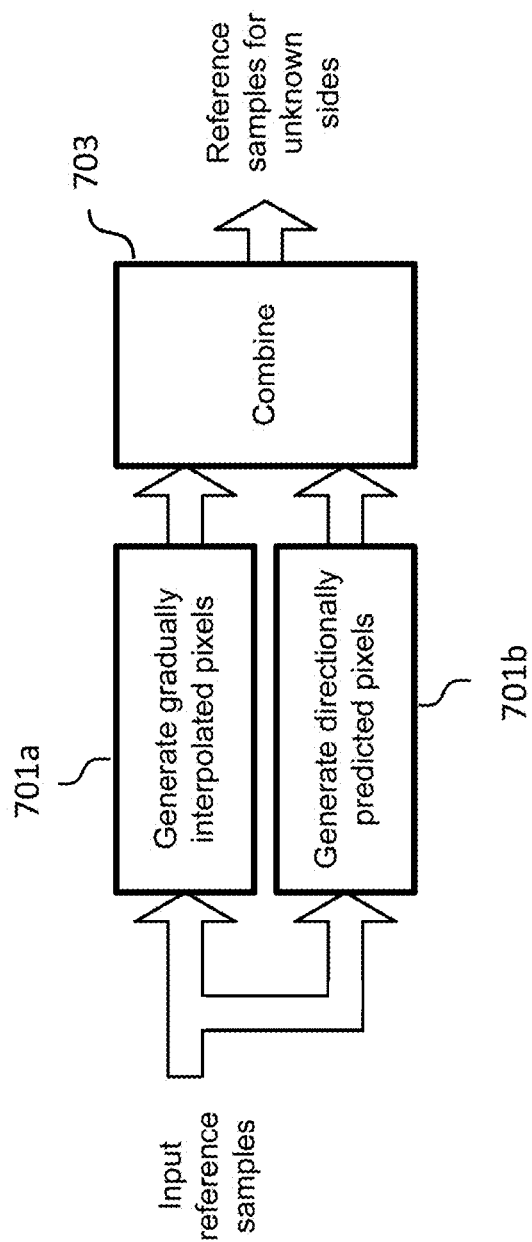
FIG. 7 shows a diagram illustrating intra-prediction processing steps implemented in an intra-prediction apparatus according to an embodiment.

FIG. 7 shows a schematic diagram illustrating a general concept implemented in the reference pixel unit 101 of an apparatus 100 according to an embodiment for generating the secondary reference pixels, including the second reference pixel. The reference pixel unit 101 according to embodiments of the invention uses a combination of two components, namely gradually interpolated pixel values or components 701a and directionally predicted pixel values or components 701b, i.e. pixels predicted on the basis of a directional prediction, as provided, for instance, by the 33 directional modes defined in the HEVC/H.265 standard.

As illustrated in FIG. 7, according to embodiments of the invention these two components can be computed independently and combined 703 in order to obtain the secondary reference samples $p_{rs1}$ directly or by means of an interpolation of these values. According to embodiments of the invention, directionally predicted values are calculated the same way as if these pixels would belong to the block being predicted, i.e. the pixels "inside" of the currently processed video coding block. The combination of these two components can be performed in different ways.

In an embodiment, the reference pixel unit 101 is configured to take a weighted sum of the first component, i.e. the directionally predicted pixel value, and the second component, i.e. the gradually interpolated pixel value, for generating a secondary reference pixel value on the basis of the following equation:

$$p_{rs}[k]=w_{grad}[k] \cdot p_{grad}[k] w_{int}[k] \cdot p_{int}[k]$$

wherein $w_{grad}[k]+w_{int}[k]=1$ and $0 \leq w_{grad}[k], w_{int}[k] \leq 1$ and k denotes the index for identifying the secondary reference pixel values. For instance, in figure the index k runs from 0 (secondary reference pixel to the left in the bottom row) to 2N (secondary reference pixel at the top in the row on the right side of the currently processed video coding block). In an embodiment, the weights $w_{grad}[k]$, $w_{int}[k]$ can have the value 0.5. In an embodiment, the weights $w_{grad}[k]$, $w_{int}[k]$ can depend on the size of the current video coding block and/or the selected directional mode. In an embodiment, the weight $w_{grad}[k]$ can have the values provided in the following table (wherein the weight $w_{int}[k]$ can be derived from the relation $w_{grad}[k]+w_{int}[k]=1$ and the numbers defining the respective angular mode range are indexes identifying different directional modes):

| Angular mode range | Block size | | |
|---|---|---|---|
| | 8 × 8 | 16 × 16 | 32 × 32 |
| [2; 14) | 0.75 | 0.75 | 0.5 |
| [14; 26) | 1.0 | 1.0 | 0.75 |
| [26; 38) | 0.75 | 0.75 | 1.0 |
| [38; 50) | 0.5 | 0.0 | 0.25 |
| [50; 67) | 0.5 | 0.0 | 1.0 |

In another embodiment, the reference pixel unit 101 is configured to generate the secondary pixel values $p_{rs}[k]$, including the second reference pixel, by blending (which can include non-linear operations) the first components, i.e. the directionally predicted pixel values, and the second components, i.e. the gradually interpolated pixel values.

Figure 8:
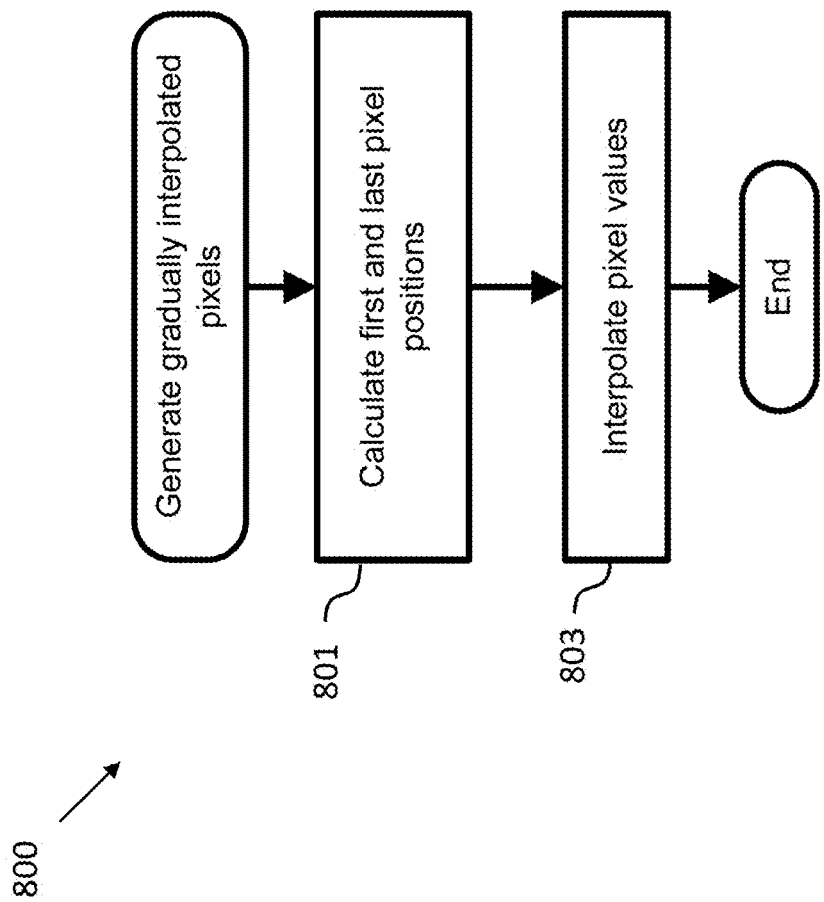
FIG. 8 shows a diagram illustrating intra-prediction processing steps implemented in an intra-prediction apparatus according to an embodiment.

FIG. 8 shows a diagram illustrating intra-prediction processing steps implemented in the intra-prediction apparatus 100 according to an embodiment, which is based on a two-stage process 800 for generating the gradually interpolated pixel values.

In a first processing stage 801, the reference pixel unit 101 is configured to determine the secondary reference pixel values of a first and second (or last) secondary reference pixel, wherein the first and the last secondary reference pixels are those secondary reference pixels that are adjacent to the primary reference pixels. For the exemplary scenario shown in FIG. 4 the first secondary reference pixel (being associated with a pixel value $p_{rs}[0]$) is the most left pixel in the bottom row and the last secondary reference pixel (being associated with a pixel value $p_{rs}[2N]$) is the top pixel in the row on the right hand side of the currently processed video coding block.

In an embodiment, the reference pixel unit 101 is configured to determine the first secondary reference pixel value $p_{rsg}[0]$ and the second secondary reference pixel value $p_{rsg}[2N]$ on the basis of the following equations:

$$p_{rsg}[0]=w_{int} \cdot p_{int}[0]+w_{rs}[-N] \cdot p_{rs}[-N]+w_{rs}[-N-1] \cdot p_{rs}[-N-1]+w_{rs}[-N-2] \cdot p_{rs}[-N-2]$$

$$p_{rsg}[2N]=w_{int} \cdot p_{int}[2N] w_{rs}[N] \cdot p_{rs}[N]+w_{rs}[N+1] \cdot p_{rs}[N+1]+w_{rs}[N+2] \cdot p_{rs}[N+2],$$

wherein $p_{rs}$ denotes the pixel value of a respective primary reference pixel and $w_{rs}$ denotes a primary reference pixel weight.

The second processing stage 803 of the process shown in FIG. 8 can be done in different ways. In an embodiment, the reference pixel unit 101 of the apparatus 100 is configured to generate the gradually interpolated pixel values, i.e. the respective second component for generating the respective secondary reference pixel value $p_{rs}[k]$ using linear interpolation. In an embodiment, the reference pixel unit 101 of the apparatus 100 is configured to determine the value of a step size on the basis of the following equation:

$$s = \frac{p_{rsg}[2N] - p_{rsg}[0]}{2N}$$

and to use this value for the step size s to compute the gradually interpolated values:

$$p_{grad}[k]=p_{grad}[0]+k \cdot s.$$

In another embodiment, the reference pixel unit 101 of the apparatus 100 is configured to define an average pixel value of the first and the last of the gradually interpolated pixels, for instance, on the basis of the following equation:

$$\frac{p_{rsg}[0] + p_{rsg}[2N]}{2}.$$

Figure 9:
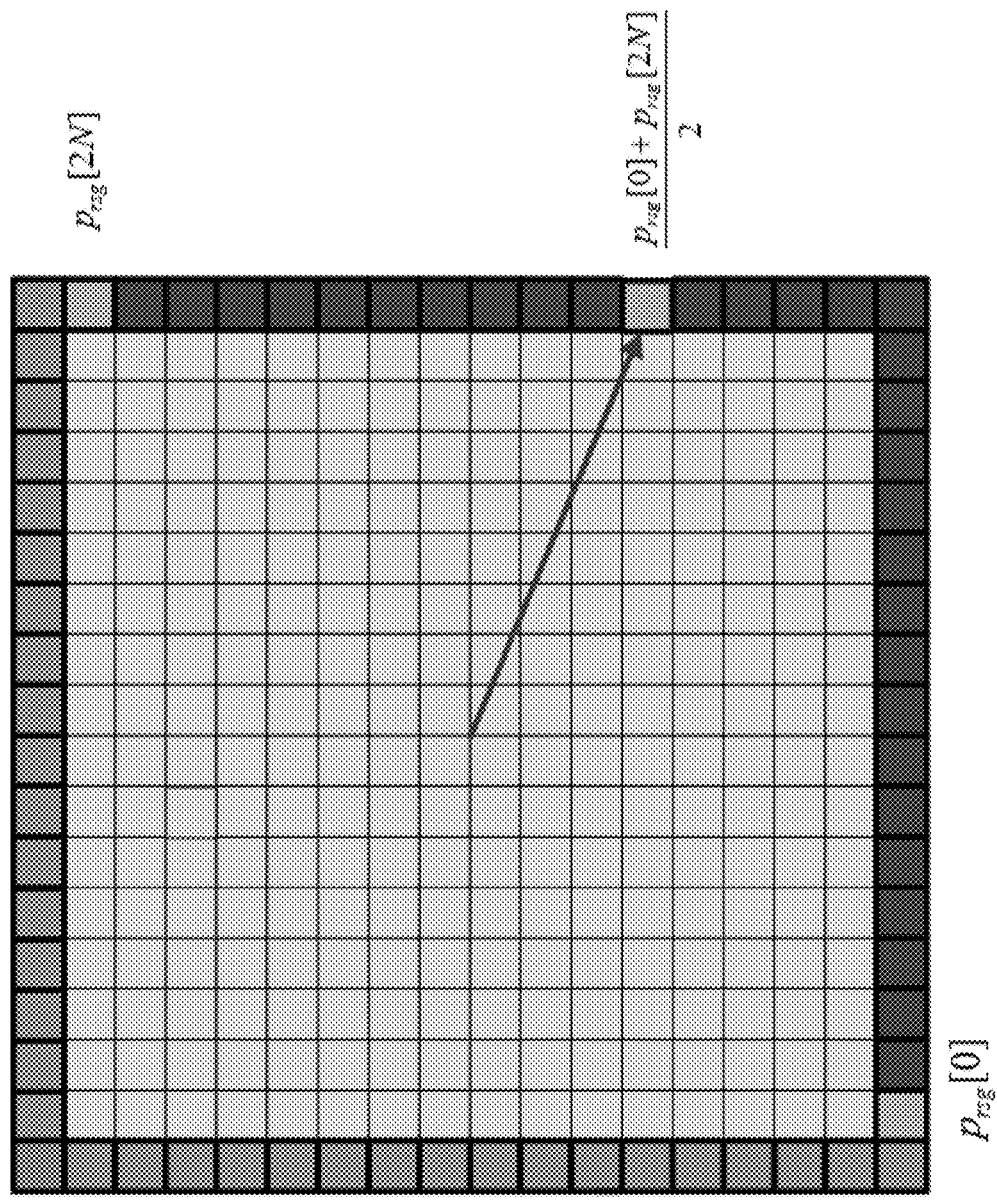
FIG. 9 shows a schematic diagram of a video coding block illustrating an aspect of an intra-prediction apparatus according to an embodiment.

In an embodiment, which is illustrated on the basis of the exemplary video coding block shown in FIG. 9, the reference pixel unit 101 of the apparatus 100 is configured to determine a corresponding secondary reference pixel for this average pixel value by projecting of the point located at the middle of the currently processed video coding block to the positions of the secondary reference pixels. The coordinates of the point located at the middle of the currently processed video coding block can be expressed as follows:

$$(x, y) = \left(\frac{W}{2}, \frac{H}{2}\right),$$

wherein W and H denote the width and height of the currently processed video coding block, respectively. For this embodiment, the second processing stage 803 shown in FIG. 8 becomes dependent on the intra-prediction mode used for predicting the first components, i.e. the directionally predicted pixel values, of the secondary reference pixel values, because the interpolation is performed taking into account the position of the secondary reference pixel associated with the average pixel value. In further embodiments, two different step size values could be used by the reference pixel unit 101 to perform linear interpolation between the points, namely:

$$\left( p_{rsg}[0], \frac{p_{rsg}[0] + p_{rsg}[2N]}{2} \right] \text{ and } \left[ \frac{p_{rsg}[0] + p_{rsg}[2N]}{2}, p_{rsg}[2N] \right).$$

In further embodiments, the reference pixel unit 101 can be configured to use instead of a linear interpolation a 2-nd or higher order interpolation for determining the gradually interpolated pixel values in the interval ($p_{rsg}[0]$, $p_{rsg}[2N]$).

Figure 10:
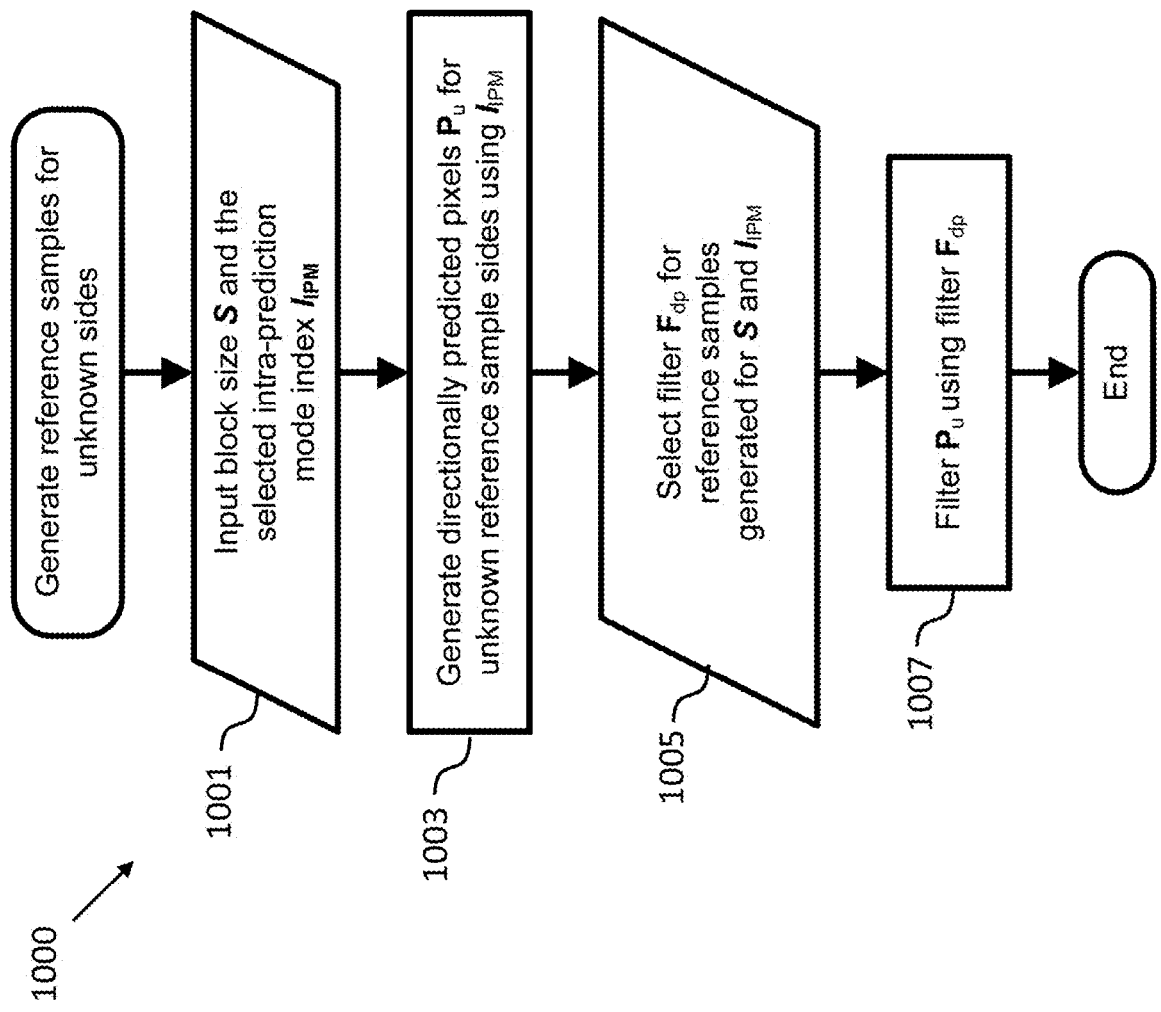
FIG. 10 shows a diagram illustrating intra-prediction processing steps implemented in an intra-prediction apparatus according to an embodiment.

FIG. 10 illustrates an algorithm 1000 implemented in the reference pixel unit 101 according to further embodiments for generating the secondary reference pixel values, including the second reference pixel value, and/or as an alternative to the processing step 803 shown in FIG. 8.

In a first processing step 1001 of the algorithm shown in FIG. 10 a size S of the currently processed video coding block to be predicted and an intra prediction mode $I_{IPM}$ are selected. In the next processing step 1003 is directionally predicted pixels $P_u$ are generated for the unknown reference sample sides using the intra prediction mode $I_{IPM}$ selected in processing step 1001. In an embodiment, the reference pixel unit 101 is configured to provide one or more conventional intra prediction mechanisms (e.g. the conventional intra prediction mechanisms defined in the standard H.265) for selection and use in processing step 1003 of FIG. 10. In embodiments of the invention the processing step 1003 can include a filtering or no filtering of the primary reference pixel values used for generating the secondary reference pixel values.

After the secondary reference pixels have been directionally generated, the reference pixel unit 101 of the apparatus can be configured to filter these secondary reference pixels by a filter $F_{dp}$ in a processing step 1007, wherein the reference pixel unit 101 can be configured to select the filter $F_{dp}$ according to the size S of the currently processed video coding block, i.e. the block to be predicted, and/or the selected intra prediction mode $I_{IPM}$. (see processing step 1005 in FIG. 10). In embodiments of the invention, the $F_{dp}$ filter applied in processing step 1007 could differ from the one optionally applied to the primary reference samples in processing step 1003.

In an embodiment, the reference pixel unit 101 can be configured to select the filter $F_{dp}$ in processing step 1005 to be stronger than the filters specified in the H.265 standard to filter known reference samples. However, it is possible to apply different filters $F_{dp}$, including but not limiting to FIR, IIR, non-linear or median filters. These filters may provide different effects including blurring, de-ringing or sharpening.

In the following sections further embodiments of the encoding apparatus 201 and the decoding apparatus 211 will be described, including the signaling between the apparatus 201 and the decoding apparatus 211 as implemented by embodiments of the invention. As will be appreciated, embodiments of the invention do not require a special signaling at the side of the decoding apparatus 211 and, therefore, do not increase the complexity of bitstream parsing operations.

Figure 11:
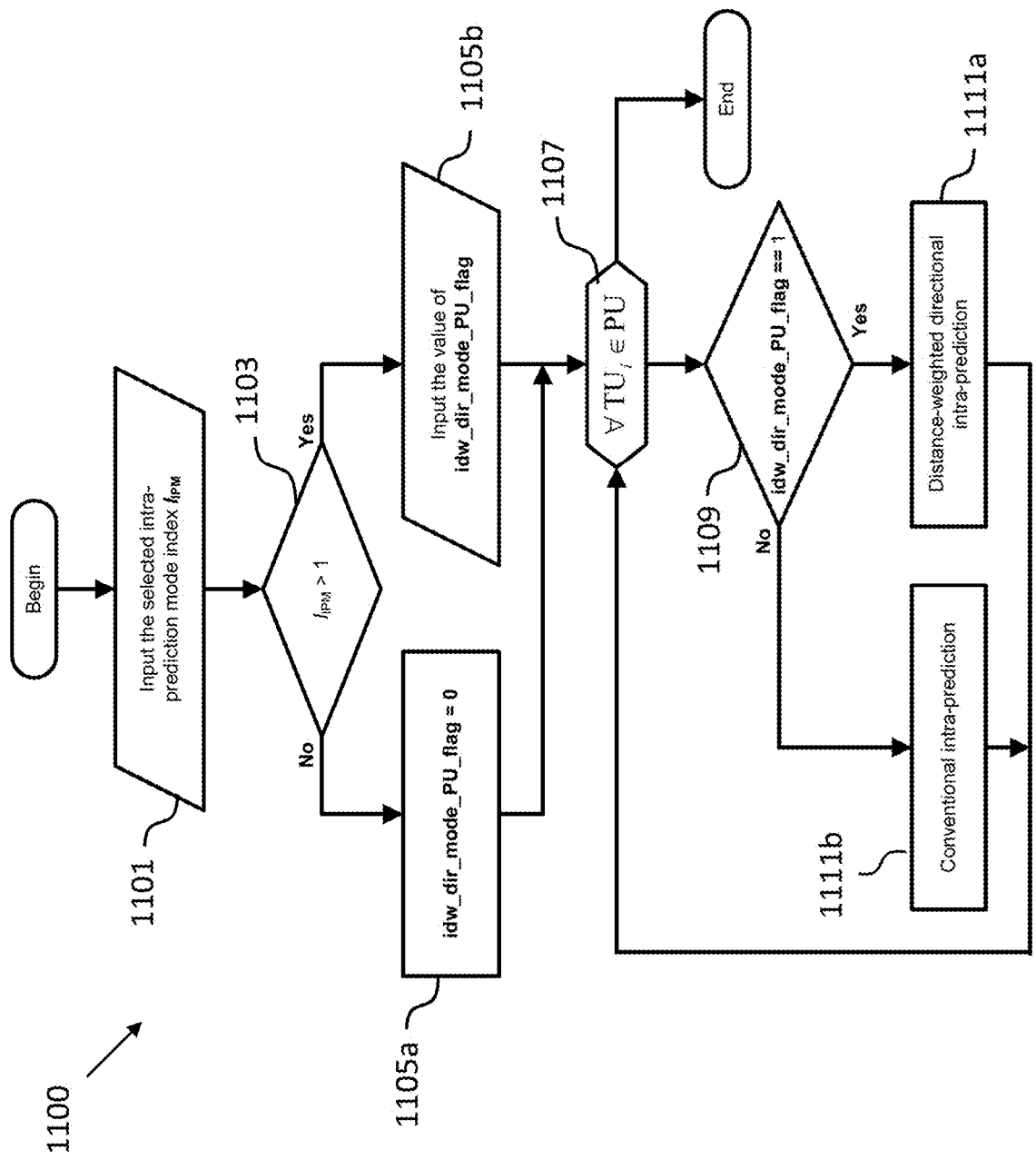
FIG. 11 shows a diagram illustrating processing steps implemented in a decoding apparatus according to an embodiment.

FIG. 11 shows a processing scheme 1100 implemented in the decoding apparatus 211 according to an embodiment based on the HEVC standard.

In a first processing step 1101 the index of the intra prediction mode $I_{IPM}$ is parsed from the bitstream. Thereafter, in processing step 1103 a decision is taken depending on whether the decoded intra prediction mode is a directional intra prediction mode. In the case the signaling scheme is applied in the context of HEVC video coding, the intra prediction mode is directional when $I_{IPM}$ is greater than 1. Embodiments of the invention can make use of the planar mode as well. In such a case, this condition can be written as $I_{IPM}$ is not equal to 1.

For directional (and possibly planar) intra prediction modes the value of the flag "idw_dir_mode_PU_flag" is parsed from the bitstream in processing step 1105b. According to embodiments of the invention this flag is introduced into the bitstream to code whether to apply the proposed mechanism to the prediction unit (a set of transform units). In an embodiment, the value of this flag is assigned to 0 for non-directional (DC and PLANAR) intra prediction modes in step 1105a. In processing step 1107, TUs belonging to a PU are determined, and for each TU a decision is taken (processing step 1109) to use either a conventional prediction scheme (processing step 1111b) or the distance-weighted prediction (processing step 1111a), as provided by embodiments of the invention, for obtaining the predicted signal. The decision for a TU in processing step 1109 is taken on the basis of the value of the flag "idw_dir_mode_PU_flag", which has been determined in processing steps 1105a and 1105b.

Figure 12:
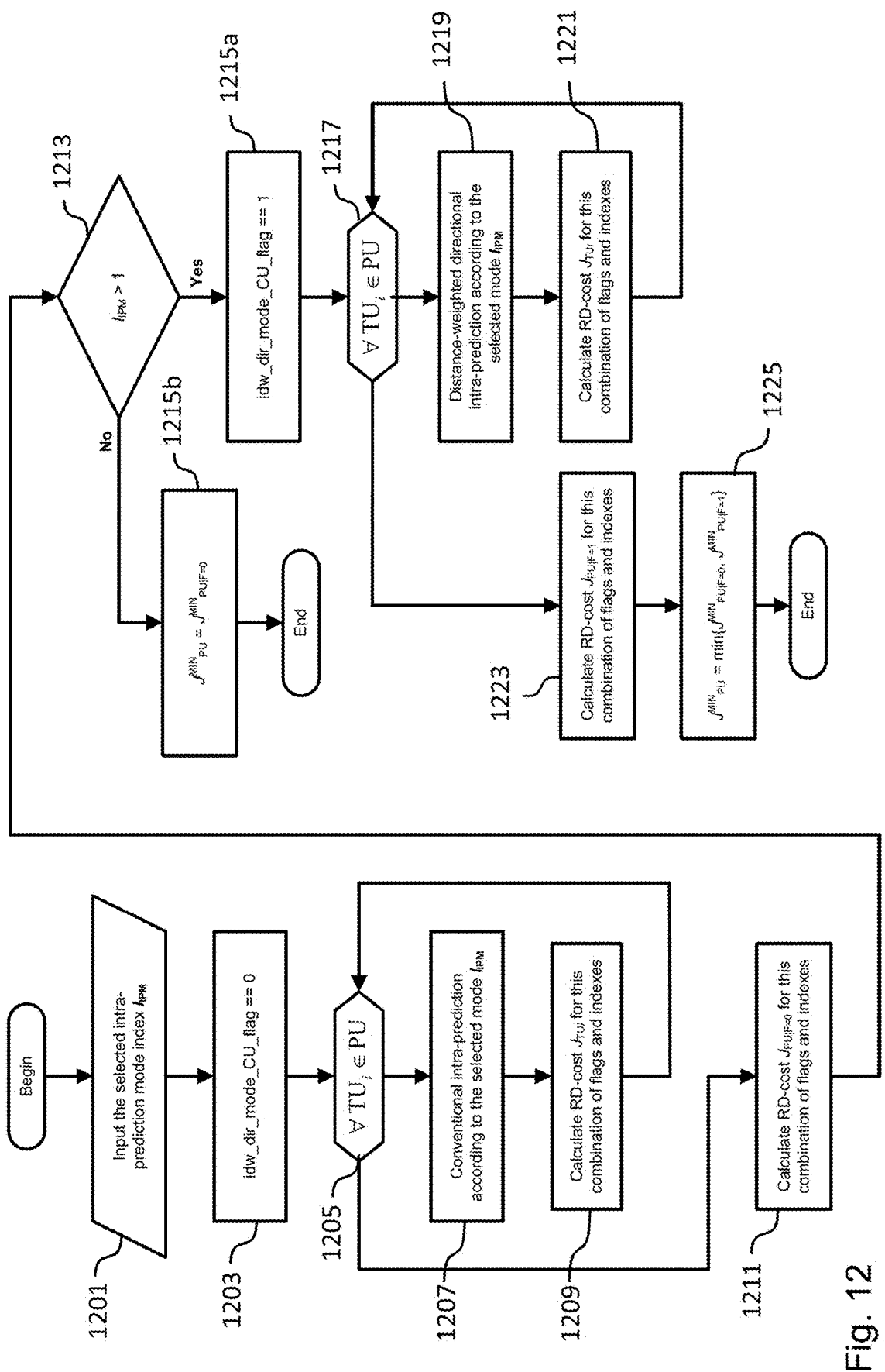
FIG. 12 shows a diagram illustrating processing steps implemented in a decoding apparatus according to an embodiment.

FIG. 12 shows a processing scheme 1200 implemented in the encoding apparatus 201 according to an embodiment based on the HEVC standard.

The processing scheme 1200 starts in a processing step 1201 by selecting an intra prediction mode out of the set of candidate intra prediction modes for the given PU. Then, the flag "idw_dir_mode_PU_flag" is assigned to a value of 0 (see processing step 1203), which means that distance-weighted directional prediction (DWDIP) is not applied within the PU. For each TU of the PU a rate-distortion cost (RD-cost) is estimated (see processing steps 1205, 1207, 1209). A PU coding cost could be estimated by summing up the RD-costs for the TUs and adding signaling costs (see processing step 1211).

If the intra-prediction mode picked up from candidate intra prediction modes list is not directional, there are no further calculations: the RD-cost for the given PU and intra-prediction mode is determined (see processing steps 1213 and 1215 b). Otherwise, similar operations (see processing steps 1215 a, 1217, 1219, 1221 and 1223) are performed for the case when the flag "idw_dir_mode_PU_flag" is set to 1, i.e. DWDIP is enabled for the given PU. The decision by the encoding apparatus 201 about which value of the flag "idw_dir_mode_PU_flag" should be used can be made by comparing RD-costs (see processing step 1225).

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. An intra prediction apparatus for intra prediction of pixel values of pixels of a current video coding block of a frame of a video signal, on the basis of a plurality of reference pixel values of a plurality of reference pixels, the apparatus comprising:
    an intra prediction unit configured for:
        intra predicting a pixel value of a current pixel of the current video coding block based on:
            a first reference pixel value of a first reference pixel of the plurality of reference pixels, wherein the first reference pixel is located in a first neighboring video coding block,
            a second reference pixel value of a second reference pixel of the plurality of reference pixels, wherein the second reference pixel is located in a second neighboring video coding block,
            a distance between the current pixel and the first reference pixel, and
            a distance between the current pixel and the second reference pixel,
        wherein the first reference pixel and the second reference pixel are located at opposite sides of the current pixel, and
        wherein the second reference pixel is located at a bottom side of the current video coding block, or the second reference pixel is located at a right side of the current video coding block.

2. The intra prediction apparatus of claim 1, wherein the intra prediction apparatus is configured to intra predict the pixel value of the current pixel of the current video coding block as a sum of a product of a first weight with the first reference pixel value and a product of a second weight with the second reference pixel value.

3. The intra prediction apparatus of claim 1, wherein the current pixel, the first pixel and the second pixel lie on a straight line.

4. The intra prediction apparatus of claim 1, wherein the plurality of reference pixel values comprises: a plurality of primary reference pixel values, including the first reference pixel, and a plurality of secondary reference pixel values, including the second reference pixel,
    wherein the apparatus further comprises a reference pixel unit configured to generate, based on the plurality of primary reference pixel values, the plurality of secondary reference pixel values,
    wherein the plurality of primary reference pixel values are associated with a plurality of primary reference pixels located in neighboring video coding blocks of the current video coding block, including the first neighboring video coding block,
    wherein the plurality of secondary reference pixel values are associated with a plurality of secondary reference pixels located in further neighboring video coding blocks of the current video coding block, including the second neighboring video coding block, and
    wherein the further neighboring video coding blocks differ from the neighboring video coding blocks.

5. The intra prediction apparatus of claim 4, wherein the plurality of primary reference pixels are located in a row of pixels directly above the current video coding block and in a column of pixels to the left or to the right of the current video coding block.

6. The intra prediction apparatus of claim 4, wherein the reference pixel unit is further configured to:
    determine, for each secondary reference pixel value of a subset of the plurality of secondary reference pixel values, a first component of the secondary reference pixel value on the basis of directional intra prediction and a second component of the secondary reference pixel value based on an interpolation prediction between a first secondary reference pixel value and a second secondary reference pixel value; and
    combine the first component of the secondary reference pixel value and the second component of the secondary reference pixel value to generate the secondary reference pixel value, wherein the first secondary reference pixel value and the second secondary reference pixel value are not part of the subset of the plurality of secondary reference pixel values.

7. The intra prediction apparatus of claim 6, wherein the reference pixel unit is configured to use a directional mode of an H.264 standard, an H.265 standard, or a standard evolved from one of these standards for determining the first component of the secondary reference pixel value on the basis of the directional intra prediction.

8. The intra prediction apparatus of claim 6, wherein the reference pixel unit is further configured to determine the first secondary reference pixel value on the basis of the primary reference pixel values of primary reference pixels neighboring the first secondary reference pixel and the second secondary reference pixel value on the basis of the primary reference pixel values of primary reference pixels neighboring the second secondary reference pixel.

9. The intra prediction apparatus of claim 8, wherein the reference pixel unit is configured to determine the first secondary reference pixel value $p_{rsg}[0]$ and the second secondary reference pixel value $p_{rsg}[2N]$ based on:

$$p_{rsg}[0]=w_{int} \cdot p_{int}[0]+w_{rs}[-N] \cdot p_{rs}[-N]+w_{rs}[-N-1] \cdot p_{rs}[-N-1]+w_{rs}[-N-2] \cdot p_{rs}[-N-2]$$

$$p_{rsg}[2N]=w_{int} \cdot p_{int}[2N]w_{rs}[N] \cdot p_{rs}[N]+w_{rs}[N+1] \cdot p_{rs}[N+1]+w_{rs}[N+2] \cdot p_{rs}[N+2],$$

wherein $w_{rs}$ denotes a weight with a reference pixel value, $p_{rs}$ denotes a secondary reference pixel value, $w_{int}$ denotes another weight, and $p_{int}$ denotes a first component of the secondary reference pixel value, and wherein N denotes a linear size of the current video coding block.

10. The intra prediction apparatus of claim 6, wherein the reference pixel unit is configured to determine the second component $p_{grad}[k]$ of the secondary reference pixel value based on the interpolation prediction between the first secondary reference pixel value ($p_{rsg}[0]$) and the second secondary reference pixel value ($p_{rsg}[2N]$) based on:

$$p_{grad}[k] = p_{rsg}[0] + k \cdot s,$$
$$\text{with } s = \frac{p_{rsg}[2N] - p_{rsg}[0]}{2N}$$

wherein N denotes a linear size of the current video coding block.

11. The intra prediction apparatus of claim 6, wherein the reference pixel unit is configured to combine the first component $p_{int}[k]$ of the secondary reference pixel value and the second component $p_{grad}[k]$ of the secondary reference pixel value to generate the secondary reference pixel value $p_{rs}[k]$ based on:

$$p_{rs}[k] = w_{grad}[k] \cdot p_{grad}[k] + w_{int}[k] \cdot p_{int}[k],$$

wherein $w_{grad}[k] + w_{int}[k] = 1$ and $0 \le w_{grad}[k], w_{int}[k] \le 1$, wherein k denotes the index for identifying the secondary reference pixel values, and wherein $w_{int}$ denotes a weight and $p_{int}$ denotes a first component of the secondary reference pixel value.

12. The intra prediction apparatus of claim 11, wherein the reference pixel unit is configured to adjust the weights $w_{grad}[k]$ and/or $w_{int}[k]$ depending on a direction, on the index k and/or on a size of the current video coding block.

13. An encoding apparatus for encoding a current video coding block of a frame of a video signal, the current video coding block comprising a plurality of pixels, each pixel associated with a pixel value, the encoding apparatus comprising:

an intra prediction apparatus according to claim 1 for providing a predicted video coding block; and an encoder configured to encode the current video coding block on the basis of the predicted video coding block.

14. A decoding apparatus for decoding an encoded video coding block of a frame of a video signal, the encoded video coding block comprising a plurality of pixels, each pixel associated with a pixel value, the decoding apparatus comprising:

an intra prediction unit for providing a predicted video coding block, the intra prediction unit configured for:
intra predicting a pixel value of a current pixel of a current video coding block based on:
a first reference pixel value of a first reference pixel of a plurality of reference pixels, wherein the first reference pixel is located in a first neighboring video coding block,
a second reference pixel value of a second reference pixel of the plurality of reference pixels, wherein the second reference pixel is located in a second neighboring video coding block,
a distance between the current pixel and the first reference pixel, and
a distance between the current pixel and the second reference pixel, wherein the first reference pixel and the second reference pixel are located at opposite sides of the current pixel, and wherein the second reference pixel is located at a bottom side of the current video coding block, or the second reference pixel is located at a right side of the current video coding block.

15. A non-transitory computer readable medium comprising program code which, when executed by a computer, causes the computer to perform a method for intra prediction of pixel values of pixels of a current video coding block of a frame of a video signal based on a plurality of reference pixel values of a plurality of reference pixels, the method comprising:

intra predicting a pixel value of a current pixel of the current video coding block based on:
a first reference pixel value of a first reference pixel of the plurality of reference pixels, wherein the first reference pixel is located in a first neighboring video coding block,
a second reference pixel value of a second reference pixel of the plurality of reference pixels, wherein the second reference pixel is located in a second neighboring video coding block,
a distance between the current pixel and the first reference pixel, and
a distance between the current pixel and the second reference pixel, wherein the first reference pixel and the second reference pixel are located at opposite sides of the current pixel, and wherein the second reference pixel is located at a bottom side of the current video coding block, or the second reference pixel is located at a right side of the current video coding block.

16. The intra prediction apparatus of claim 4, wherein the plurality of primary reference pixels are located in a row of pixels directly below the current video coding block and in a column of pixels to the left or to the right of the current video coding block.

17. The intra-prediction apparatus of claim 1, wherein the intra prediction unit is configured to intra predict the pixel value of the current pixel of the current video coding block further based on:

a product of a first weight with the first reference pixel value, wherein the first weight is based on the distance between the current pixel and the second reference pixel and a distance between the first reference pixel and the second reference pixel, and a product of a second weight with the second reference pixel value, wherein the second weight is based on the distance between the current pixel and the first reference pixel and the distance between the first reference pixel and the second reference pixel; and wherein the distance between the first reference pixel and the second reference pixel is a sum of the distance between the current pixel and the first reference pixel and the distance between the current pixel and the second reference pixel.

18. The intra-prediction apparatus of claim 17, wherein the first weight ($w_{rs0}$) and the second weight ($w_{rs1}$) are determined based on:

$$w_{rs0} = \frac{d_{rs1}}{D} \text{ and } w_{rs1} = \frac{d_{rs0}}{D},$$

wherein $d_{rs1}$ denotes the distance between the current pixel and the second reference pixel, $d_{rs0}$ denotes the distance between the current pixel and the first reference pixel and D denotes the distance between the first reference pixel and the second reference pixel.

19. The decoding apparatus of claim 14, wherein the intra prediction unit is configured to intra predict the pixel value of the current pixel of the current video coding block further based on:
- a product of a first weight with the first reference pixel value, wherein the first weight is based on the distance between the current pixel and the second reference pixel and a distance between the first reference pixel and the second reference pixel, and
- a product of a second weight with the second reference pixel value, wherein the second weight is based on the distance between the current pixel and the first reference pixel and the distance between the first reference pixel and the second reference pixel; and
- wherein the distance between the first reference pixel and the second reference pixel is a sum of the distance between the current pixel and the first reference pixel and the distance between the current pixel and the second reference pixel.

20. The decoding apparatus of claim 19, wherein the first weight ($w_{rs0}$) and the second weight ($w_{rs1}$) are determined based on:

$$w_{rs0} = \frac{d_{rs1}}{D} \text{ and } w_{rs1} = \frac{d_{rs0}}{D},$$

wherein $d_{rs1}$ denotes the distance between the current pixel and the second reference pixel, $d_{rs0}$ denotes the distance between the current pixel and the first reference pixel and D denotes the distance between the first reference pixel and the second reference pixel.

21. The intra-prediction apparatus of claim 1, wherein the size of the current video coding block is N×N, and
- wherein the second reference pixel is a pixel in a row below an N-th row of the current video coding block, or
- wherein the second reference pixel is a pixel in a column right of an N-th column of the current video coding block.

22. The decoding apparatus of claim 14, wherein the size of the current video coding block is N×N, and
- wherein the second reference pixel is a pixel in a row below an N-th row of the current video coding block, or
- wherein the second reference pixel is a pixel in a column right of an N-th column of the current video coding block.

\* \* \* \* \*